US012033346B2

(12) United States Patent
Fonseca et al.

(10) Patent No.: US 12,033,346 B2
(45) Date of Patent: Jul. 9, 2024

(54) DISTANCE REPRESENTATION AND ENCODING

(71) Applicant: Zoox, Inc., Foster City, CA (US)

(72) Inventors: Rasmus Fonseca, Boulder Creek, CA (US); Marin Kobilarov, Baltimore, MD (US); Lingfeng Zhang, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 340 days.

(21) Appl. No.: 17/649,645

(22) Filed: Feb. 1, 2022

(65) Prior Publication Data
US 2023/0245336 A1    Aug. 3, 2023

(51) Int. Cl.
*G06T 7/00*    (2017.01)
*G06T 7/20*    (2017.01)
*G06T 7/70*    (2017.01)

(52) U.S. Cl.
CPC .............. *G06T 7/70* (2017.01); *G06T 7/20* (2013.01); *G06T 2207/30241* (2013.01); *G06T 2207/30252* (2013.01)

(58) Field of Classification Search
CPC ... G06T 7/70; G06T 7/20; G06T 2207/30241; G06T 2207/30252; G06T 2207/10028; G06T 2207/20021; G06T 2207/20081; G06T 2207/20084; G06T 7/73; G06T 2207/30261
See application file for complete search history.

(56) References Cited

U.S. PATENT DOCUMENTS

| 11,002,859 | B1 | 5/2021 | Zhang | |
| 11,661,076 | B1* | 5/2023 | Garg | G06F 18/22 |
| | | | | 701/23 |
| 2007/0182623 | A1 | 8/2007 | Zeng | |
| 2012/0143856 | A1* | 6/2012 | Klinkigt | G06V 10/757 |
| | | | | 707/723 |
| 2018/0101738 | A1 | 4/2018 | Mualla | |
| 2019/0004166 | A1 | 1/2019 | Orlowski | |
| 2019/0354782 | A1* | 11/2019 | Kee | G05D 1/0088 |
| 2020/0393567 | A1* | 12/2020 | Schroeter | G01S 19/01 |
| 2021/0192748 | A1* | 6/2021 | Morales Morales | |
| | | | | G05D 1/0221 |

(Continued)

FOREIGN PATENT DOCUMENTS

WO    WO2020160798 A1    8/2020

OTHER PUBLICATIONS

PCT Search Report and Written Opinion dated May 9, 2023 for PCT Application No. PCT/US23/60872, 10 pages.

*Primary Examiner* — Van D Huynh
(74) *Attorney, Agent, or Firm* — Lee & Hayes, P.C.

(57) ABSTRACT

Techniques for generating more accurate determinations of object proximity by using vectors in data structures based on vehicle sensor data are disclosed. Vectors reflecting a distance and direction to a nearest object edge from a reference point in a data structure are used to determine a distance and direction from a point of interest in an environment to a nearest surface. In some examples, a weighted average query point response vector is determined using the determined distance vectors of cells neighboring the cell in which the point of interest is located and nearest to the same object as the query point, providing a more accurate estimate of the distance to the nearest object from the point of interest.

20 Claims, 5 Drawing Sheets

(56) References Cited

U.S. PATENT DOCUMENTS

| | | | |
|---|---|---|---|
| 2021/0209785 A1* | 7/2021 | Unnikrishnan | G01S 7/41 |
| 2021/0223401 A1* | 7/2021 | Ho | G05D 1/024 |
| 2021/0278523 A1* | 9/2021 | Urtasun | G01S 13/865 |
| 2022/0164350 A1* | 5/2022 | Gao | G06V 20/56 |
| 2022/0274625 A1* | 9/2022 | Garimella | G06N 3/04 |
| 2023/0105871 A1* | 4/2023 | Nichols | G01C 21/3804 |
| | | | 701/25 |
| 2023/0169777 A1* | 6/2023 | Song | G06V 20/58 |
| | | | 382/104 |
| 2023/0286530 A1* | 9/2023 | Angerer | G01C 21/3807 |

* cited by examiner

DISTANCE REPRESENTATION AND ENCODING

BACKGROUND

Various systems and techniques are utilized by autonomous vehicles to perform detection and tracking of objects, such as vehicles, pedestrians, and bicycles, in an environment. Detection and tracking techniques may use sensors to capture data in an environment and use this sensor data to detect objects in the environment. Inaccurate representations of such data may cause issues in accuracy and/or performance, which may impact the safe operation of such vehicles.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
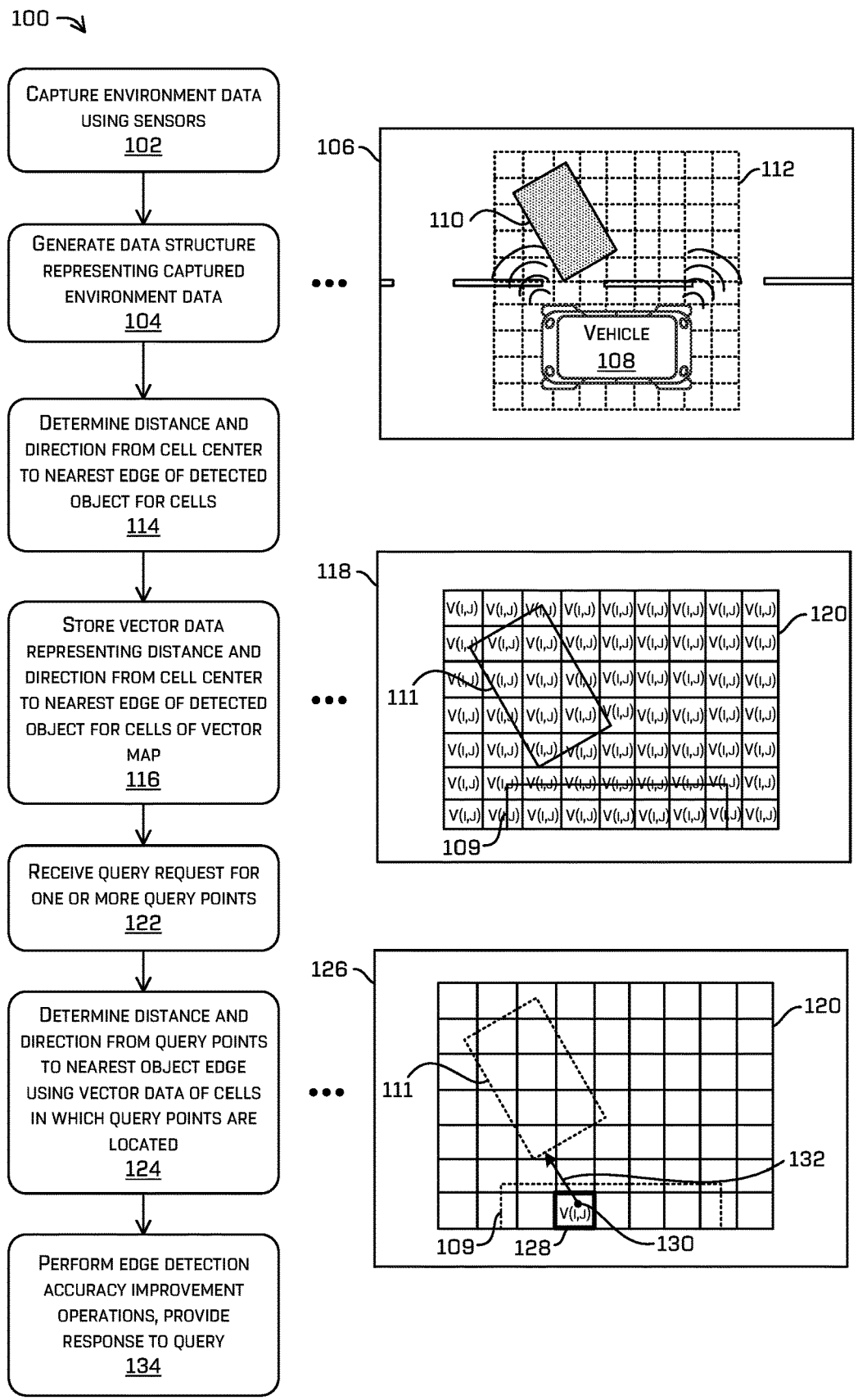
FIG. 1 is a pictorial flow diagram of an example process for generating a data structure based on environment data, in accordance with examples of the disclosure.

Techniques for generating data structures that may be used to determine distances between objects in an environment are discussed herein. In some examples, generating the data structure may include determining vector data associated with objects in the environment for the cells of the data structure. The data structure and the vector data represented therein may be used to determine distances between objects in the environment for safely navigating an autonomous vehicle through the environment.

In examples, an environment may be discretized into a plurality of cells in which cell data represented in a data structure associated with the one or more cells may include vector data (e.g., a set of values) representing a distance and a direction from a reference point to a nearest object. While a center point of a cell is used as an example herein, a reference point may be any other point in two-dimensional space (or otherwise in higher dimensional representations), including a corner point of a cell or any other point. Vector data may take the form of a distance value indicating the distance from the a reference point to a nearest edge of a nearest object (e.g. a surface of the nearest object) in the environment and a direction value indicating the direction from the reference point to the nearest edge of the nearest object in the environment. Alternatively, vector data may take the form of coordinates of the endpoints of the nearest edge of the nearest object in the environment, which may be used to calculate a vector representing a distance and a direction from a reference point to the nearest edge of the nearest object in the environment.

This vector data may then be used to determine the distance between one or more points ("query points") and an object in the environment. For example, a data structure as described herein may be used to determine the proximity of a vehicle to an object within an environment in which the vehicle is traveling. The vehicle (or portions thereof) may be represented by one or more query points. The vector data associated with a reference point (e.g., a center point or corner point of a cell in which a query point is located) may be used to determine the distance and direction from the query point to the nearest object (e.g., the nearest edge of the nearest object). These query point vectors may be represented in a vector map data structure that may be used to plan a trajectory for the vehicle through the environment, predict a trajectory for a vehicle traveling through the environment, and/or perform other operations involving the determination of distances between objects.

In certain techniques, vector data for one or more reference points (e.g., center points of one or more cells proximate to a cell containing a query point) may be leveraged to further increase the accuracy of detecting the objects nearest to particular query points using the disclosed data structures. For example, bilinear interpolation may be performed using the vector data for one or more reference points, such as center points of one or more cells neighboring the cell containing a query point, to determine a more accurate distance and direction from the query point to the nearest edge of the nearest object. In certain examples, the vector data for the query point may be determined as the shortest distance determined for the group of cells containing the cell that includes the query point and one or more neighboring cells. In various examples, neighboring cells that are not associated with a same nearest object may be removed from consideration for a determination of the distance and direction from the query point to the nearest edge of the nearest object.

The systems and techniques described herein may be directed to leveraging sensor data and pixel data to enable a vehicle, such as an autonomous vehicle, to more accurately identify objects in an environment and therefore generate a trajectory to navigate through the environment more safely by circumventing such objects. In examples, the systems and techniques described herein may also, or instead, be directed to leveraging sensor data and pixel data to enable a vehicle, such as an autonomous vehicle, to more accurately predict trajectories of other vehicles and/or mobile object in an environment and therefore operate more safely in the environment using such predictions. In particular examples, the systems and techniques described herein can utilize data structures containing vector data representing query point and/or cell center point proximity to object edges to more accurately and efficiently determine the proximity of an autonomous vehicle to objects in an environment. By using the vector data and associated data structures as described herein to represent an environment and the object present within the environment, the examples described herein may result in increased certainty of object detections, thereby allowing an autonomous vehicle to generate more accurate and/or safer trajectories for the autonomous vehicle to traverse in the environment.

For example, techniques described herein may be faster, more accurate, and/or more robust than conventional techniques, as they may increase the reliability of the determination of dimensions and other physical parameters of objects in the environment, reducing the likelihood of failing to detect or inaccurately detecting an object. That is, techniques described herein provide a technological improvement over existing object detection, classification, tracking, and/or navigation technology. In addition to improving the accuracy with which data structures can be used to detect objects and correctly determine the size, shape, and location of such objects, the systems and techniques described herein can provide a smoother ride and improve safety outcomes by, for example, more accurately providing safe passage to an intended destination.

The techniques described herein may also improve the operation of computing systems and increase resource utilization efficiency. For example, computing systems, such as vehicle computing systems, may more efficiently determine object proximity to one or more query points using the data structures and operations described herein, utilizing fewer computing resources than would be required using conventional techniques.

The systems and techniques described herein can be implemented in a number of ways. Example implementations are provided below with reference to the following figures. Although discussed in the context of an autonomous vehicle, the techniques described herein can be applied to a variety of systems (e.g., a sensor system or a robotic platform) and are not limited to autonomous vehicles. For example, the techniques described herein may be applied to semi-autonomous and/or manually operated vehicles. In another example, the techniques can be utilized in an aviation or nautical context, or in any system involving objects or entities having dimensions and/or other physical parameters that may not be known to the system. Further, although discussed in the context of originating with particular types of sensor data and processing with particular types of components, data and data structures as described herein can include any two-dimensional, three-dimensional, or multi-dimensional data such as any type of image data or sensor data (e.g., stereo cameras, time-of-flight data, and the like), lidar data, radar data, sonar data, and the like. Additionally, the techniques described herein can be used with real data (e.g., captured using sensor(s)), simulated data (e.g., generated by a simulator), or any combination of the two.

Figure 6:
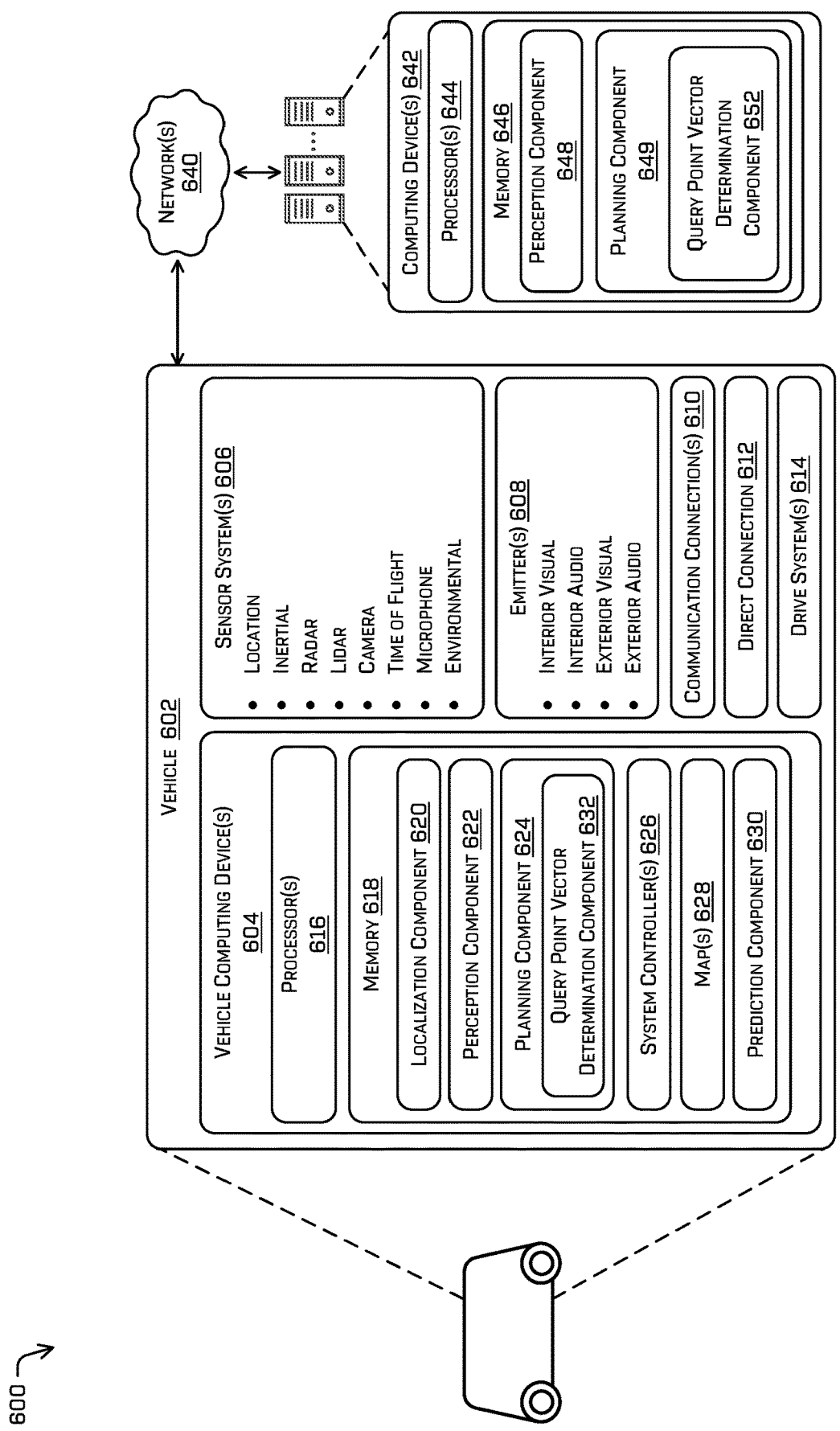
FIG. 6 depicts a block diagram of an example system for implementing the techniques described herein.

FIG. 1 is a pictorial flow diagram of an example process 100 for generating a data structure with vector data representing the proximity of reference points to a nearest edge of a surface of a nearest object in an environment for use in object detection and trajectory planning. The reference points used in this example are cell center points, but other types of reference points are contemplated for other examples, including corner points (e.g., cell corner points) or any other point in the same dimensional space as a query point (e.g., one, two, three, or more). In examples, one or more operations of the process 100 may be implemented by a vehicle computing system, such as by using one or more of the components and systems illustrated in FIG. 6 and described below. For example, one or more components and systems can include those associated with the perception component 622 of the vehicle 602 illustrated in FIG. 6. In examples, the one or more operations of the process 100 may be performed by a remote system in communication with a vehicle, such as the perception component 648 of the computing device(s) 642 illustrated in FIG. 6. In still other examples, the one or more operations of the process 100 may be performed by a combination of a remote system and a vehicle computing systems. However, the process 100 is not limited to being performed by such components and systems, and the components and systems of FIG. 6 are not limited to performing the process 100.

At an operation 102, sensors configured at or otherwise associated with an autonomous vehicle may capture data in an environment that may be used to detect objects within the environment. For example, sensors configured at an autonomous vehicle may use one or more sensors to capture images or other sensor data in an environment. That sensor data may then be processed to detect objects in the environment, such as stationary object (e.g., buildings, road markings, signs, etc.) and moving objects (e.g., people, bicycles, other vehicles, etc.). In various examples, the sensors may include one or more lidar sensors, camera sensors, radar sensors, sonar sensors, ultrasonic transducers, audio sensors, and/or any other suitable sensors.

At an operation 104, a vehicle computing system may generate detection data based on the sensor data captured at operation 102. This detection data may be generated as a scene, frame, grid, or other suitable data structure that may include image and/or pixel data and data associated therewith. In any such example, an environment proximate the vehicle (or sensor) may be discretized (e.g., as a grid) into a plurality of cells and sensor data may be associated with the one or more cells based on the relative position data indicated in the sensor data to the vehicle. In such an example, such cells may be referred to herein as representing pixel data. The cells may also include, or may be processed to generate a data structure that includes, location data (e.g., center coordinates), detected area (e.g., dimensions), and/or image detection data. Such cells may also include temporal data, such as a time of capture and/or generation. Data structures may be generated for individual sensors and/or types of sensors or for data originating as any combination of various sensors.

An example 106 illustrates a top-down view of an image of an environment that includes a vehicle 108 that may be configured with sensors to detect objects in the environment, such as an object 110. The sensors configured at the vehicle 108 may be configured to detect environment data in the area of a grid 112 as a scene. Each cell of such grid 112 may be a particular sized section of the environment (e.g., 5 cm×5 cm, 10 cm×10 cm, 25 cm×25 cm, 1 m×1 m, etc.) from a top-down perspective. The sensors may be configured to generate environment data for individual sections of the grid 112 and data indicating characteristics of those sections, such as location, dimensions, size, etc. This data may be generated and/or stored in cells of a suitable data structure.

At an operation 114, a vehicle computing system may determine, based on the detection data generated at operation 104, vector data for the individual cells of a vector map data structure using the detection data corresponding to portions of the environment associated with the cells of the vector map data structure. For example, the vehicle computing system may determine coordinates for centers of the individual cells and use the detection data to determine polygons for objects represented in the detection data structure. This data may be generated by and/or received as input from a perception component and/or one or more other components of a vehicle computing systems (e.g., as messages or output received from such components). The vehicle computing system may then determine vectors for the individual cells that represent the distance from the center of a cell to a nearest edge of a nearest object represented in the sensor data.

At an operation 116, the vehicle computing system may store the vector data and the center coordinates for the cells in corresponding cells of the vector map data structure. In certain examples, the vehicle computing system may store, for individual cells of the vector map, vector coordinates indicating the distance and direction from the center point of the individual cells to the nearest edge of the nearest object. Alternatively, or in addition, the vehicle computing system may store, for individual cells of the vector map, the coordinates of the nearest edge of the object nearest to the center point of the individual cells for use in determining the vector data for the individual cells as described herein. In examples, this vector map may be generated by a perception component of a vehicle computing system and provided to one or more planning components (e.g., one or more Graphics Processing Units (GPUs) associated with the one or more planning components) that may perform planning operations to, for example, determine query point vectors for use in generating autonomous vehicle trajectories for an autonomous vehicle traveling in an environment.

An example 118 illustrates a vector map data structure 120 that may have been, for example, generated at operation 116 by the vehicle computing system of the vehicle 108 based on sensor detections performed in the example environment 106. The polygon 111 in the example 118 may represent the object 110 from the example 106. The polygon 109 in the example 118 may represent the vehicle 108 from the example 106. The polygons 111 and 109 may be represented directly in the vector map data structure 120 or may be used to generate the vector data in the individual cells of the vector map data structure 120. Individual cells of the vector map data structure 120 may store vector data representing the distance and direction from the center point of the individual cells to the nearest edge of a nearest polygon representing an object in the environment. This vector data may take the form of vector coordinates (e.g., "$V(i,j)$" as shown in the example 118) and/or coordinates of the nearest edge of the nearest object to the center point of the individual cells.

At an operation 122, the vehicle computing system may receive a query for object proximity information for one or more query points. In examples, this query function may be associated with or included in any function or operation that may be used control a vehicle. For example, a query function may be included as part of a trajectory planning operation executed by a vehicle computing system configured at an autonomous vehicle. Example trajectory planning systems and techniques that may incorporate the data structures and techniques set forth herein are described in U.S. patent application Ser. No. 16/179,679, titled "Adaptive Scaling in Trajectory Generation," which is incorporated by reference herein in its entirety and for all purposes. However, a query function as described herein may be any function using the disclosed vector map data structures and/or any of the associated aspects described herein.

At an operation 124, for example in response to the query received at operation 122, the vehicle computing system may determine a distance and/or direction for one or more query points using the vector data associated with a cell with which the query point is associated. In certain examples, as described in more detail below, the vehicle computing system may also use vector data associated with one or more other cells that may, for example, neighbor or otherwise be proximate to cell in which the query point is associated. In examples, the vehicle computing system may use the coordinates of a query point to determine a vector from the query point to the center point of the cell in which the query point is located. The vehicle computing system then adds that vector to the vector represented by the vector data of the cell in which the query point is located to determine a vector representing an estimate of the distance and direction from the query point to the nearest edge of the nearest object.

An example 126 illustrates vector map data structure 120 and the polygons 109 and 111. In this example, a request may have been received for a determination of a distance and/or direction to the nearest object for query point 130 located in a cell 128 of the vector map 120. The vehicle computing system may determine an intermediate vector for the distance and direction from the query point 130 to the center point of the cell 128. The vehicle computing system may determine the center point vector for the cell 128 using the center point vector data (e.g., the cell vector data) for the cell 128 that represents the distance and direction of the center point of the cell 128 to the nearest edge of the nearest object. The vehicle computing system may then add the intermediate vector to the center point vector for the cell 128 to determine the query point vector 132 representing the distance and direction from the query point 130 to the nearest edge of the nearest object, such as the edge of the polygon 111 as shown in the example 126.

In examples, the distance determined between a query point and object in the environment using the disclosed technique may be used to determine an autonomous vehicle trajectory based on costs and/or constraints. For example, a trajectory determination operation may include determining a cost associated with one or more candidate trajectories and selecting a candidate for implementation based on such costs. Determining candidate trajectory costs may include detecting one or more objects in the environment and determining costs associated with a candidate trajectory based at least in part on the object costs. The object cost used in such operations may include, or be based at least in part on, a distance between the object and a query point (e.g., representing a portion of an autonomous vehicle) determined as described herein. In various examples, multiple candidate trajectory costs may be determined in parallel using the distances between objects determined as described herein. A trajectory for implementation may be selected from such candidate trajectories.

At an operation 134, the vehicle computing system may perform one or more additional operations to increase the accuracy and quality (e.g., smoothness of results provided in response to queries for query point proximity) of the object detections represented in the vector map and/or may provide the vector map data structure and/or other data as a response to the query received at operation 122. For example, the vehicle computing system may provide determined query point vector data, in some examples within a vector map data structure, for planning a trajectory through an environment.

Figure 2:
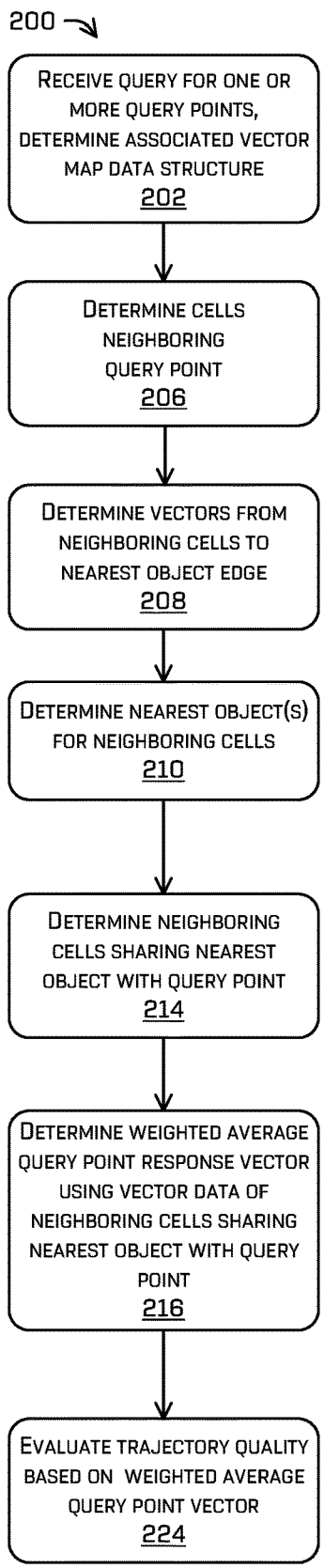
FIG. 2 is a pictorial flow diagram of an example process for generating a vector map representing a portion of an environment, in accordance with examples of the disclosure.
Figure 2:
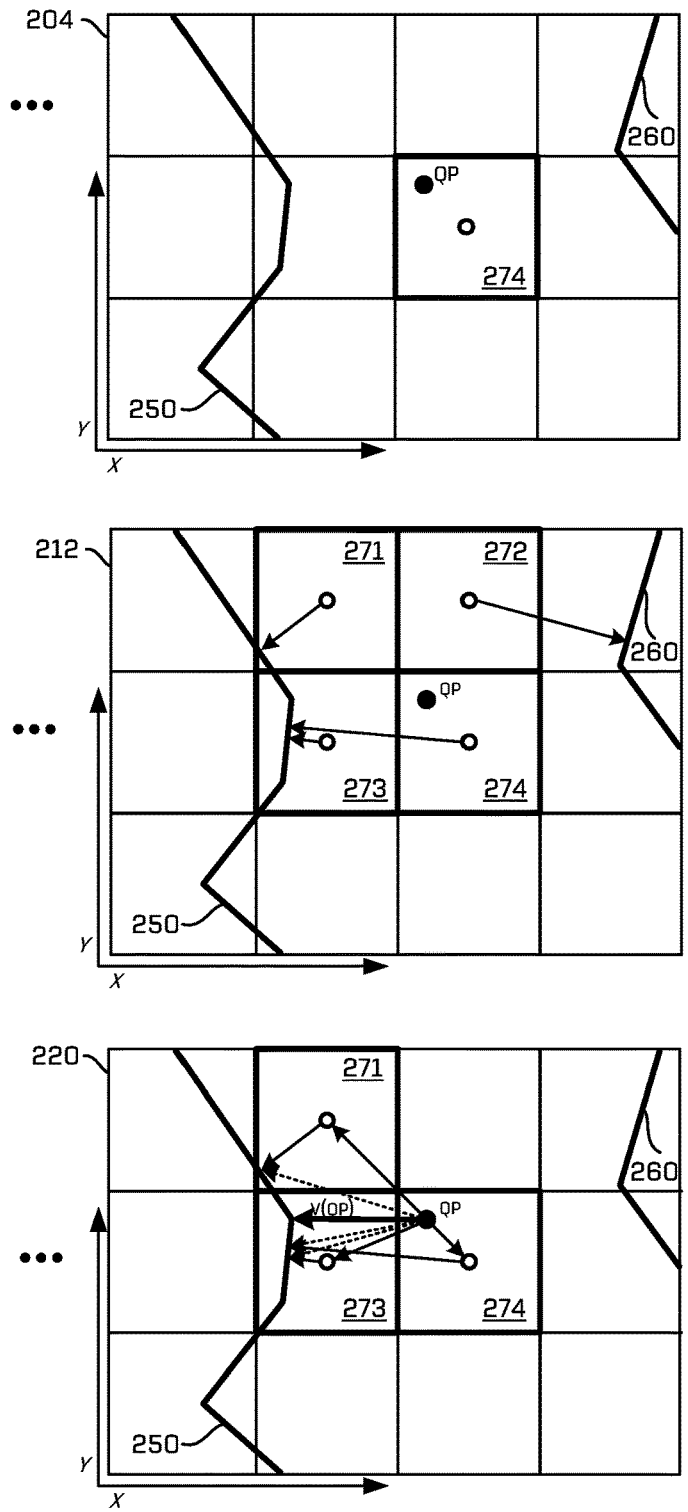

FIG. 2 is a pictorial flow diagram of an example process 200 for generating a vector map data structure representing a portion of an environment and the proximity of references points to a nearest edge of a nearest object in an environment using the query point vector data and/or various other vector data determined as described herein (e.g., in regard to the process 100 of FIG. 1) for use in object detection and trajectory planning. The reference points used in this example can represent cell center points, but other types of reference points are contemplated for other examples, including corner points (e.g., cell corner points) or any other point sharing a dimensional space (e.g., one, two, three, or more) as a query point. In examples, one or more operations of the process 200 may be implemented by a vehicle computing system, such as by using one or more of the components and systems illustrated in FIG. 6 and described below. For example, one or more components and systems can include those associated with the perception component 622 of the vehicle 602 illustrated in FIG. 6. In examples, the one or more operations of the process 200 may be performed by a remote system in communication with a vehicle, such as the perception component 648 of the computing device(s) 642 illustrated in FIG. 6. In still other examples, the one or more operations of the process 200 may be performed by a combination of a remote system and a vehicle computing systems. However, the process 200 is not limited to being performed by such components and systems, and the components and systems of FIG. 6 are not limited to performing the process 200.

At an operation 202, a vehicle computing system may receive a query for object proximity information for one or more query points (e.g., object proximity request). In examples, this query function may be associated with or included in any function or operation that may be used control a vehicle. For example, a query function may be included as part of a trajectory planning operation executed by a vehicle computing system configured at an autonomous vehicle. However, a query function as described herein may be any function using the disclosed vector map data structures and/or any of the associated aspects described herein. The vehicle computing device may also, at operation 202, determine, generate, or otherwise obtain a vector map data structure based on detected environment data (as described herein, e.g., in regard to FIG. 1) for the section of the environment associated with the query and/or its associated one or more query points.

An example 204 illustrates a vector map data structure 204 that may be determined or otherwise obtained at operation 202, for example, in response to receiving a query associated with a particular query point. The query point QP may be located a cell 274 in the vector map 204. The cells in the vector map 204 may have a center point and associated vector data (e.g., vector coordinates and/or nearest edge coordinates). Object edges 250 and 260 are also illustrated in this example.

At an operation 206, the vehicle computing system may determine neighboring cells for a cell containing a query point. In examples, the vehicle computing system may determine one or more neighboring cells by determining the cells proximate to the query point cell that are closest to the query point. For example, to determine the one or more nearest cells to the query point, the vehicle computing system may select the cell containing the query point, and the one or more cells from among those directly neighboring the cell containing the query point that are closest to the query point. In examples, the one or more neighboring cells may be determined by comparing the coordinates of the query point to the coordinates of the query point cell's center point and then adding or subtracting one coordinate unit from one or both of the center point coordinates to determine the neighboring cells. In certain examples, the vehicle computing device may determine a number of neighboring cells that provides a square groups of cells (e.g., most) proximate to the query point cell (e.g., 4, 9, 16, etc.).

For example, referring now to example 212, for the query point located in the cell 274, the vehicle computing system may determine that the neighboring cells closest to the query point are cells 271, 272, and 273. This determination may be based on determining that the query point's x coordinate is less than the center point's x coordinate, while the query point's y coordinate is greater than the center point's y coordinate. Therefore, for the cell 274 with center point coordinates (x, y), the neighboring cells are 273 with coordinates (x−1, y), 271 with coordinates (x−1, y+1), and 272 with coordinates (x, y+1), as shown in the figure.

At an operation 208, the vehicle computing system may determine vectors indicating the distance and direction from the individual center points of the determined set neighbor cells (which includes the cell containing the query point) to the nearest edge of the nearest object. For example, the vehicle computing system may use the vector coordinates stored for such a cell and/or the nearest edge coordinates stored for such a cell to determine these vectors. Using these vectors, at an operation 210, the vehicle computing system may determine the polygon with which the individual nearest edge vectors of the individual cells are associated.

Referring again to the example 212, the vectors representing the distance and direction to the nearest polygon edge from the center points of the cells 271, 272, 273, and 274 are illustrated. As can be seen in this figures, the vectors for the cells 271, 273, and 274 indicate that the nearest polygon edge to the corresponding cell center points is edge 250, while the vector for the cell 272 indicates that the nearest polygon edge to the center point of the cell 272 is edge 260. Therefore, the vectors for the cells 271, 273, and 274 are associated with a different object than the vector for the cell 272.

At an operation 214, the vehicle computing system may determine a subset of the set of neighbor cells that are associated with the same object that is nearest to the query point. For example, the vehicle computing system may determine the object that is nearest to the query point (e.g., using a query point vector as described herein) and select as members of the subset of the set of neighbor cells those cells that are associated with the same object.

For example, and referring again to the example 212, the vectors for the cells 271, 273, and 274 are associated with the edge 250 while the vector for the cell 272 is associated with the edge 260. Because the query point vector is also associated with the edge 250, the vehicle computing system may determine that cells 271, 273, and 274 are in the subset of the set of neighbor cells and that the cell 272 is not. Therefore, and as shown in the example 220, the cells 271, 273, and 274 associated with the edge 250 are clustered together for purposes of determining the query point vector.

At an operation 216, the vehicle computing system may determine a weighted average query point response vector, for example, by performing a bilinear interpolation using the vector data associated with reference points, such as the vector data of the individual cells of the subset of the set of neighbor cells that are associated with the same object that is nearest to the query point. For example, the vehicle computing system may determine a weighted average query point response vector using weighting factors and the vector data for cells of the subset of the set of neighbor cells.

A weighting factor may be based on the proximity of a reference point, such as the center point of such a cell, to the query point, with the weighting factor value for a particular cell increasing with the proximity of the query point to the respective reference point or center point of the cell. In certain examples, the weighting factors (e.g., of the subset of cells) may sum to one. For example, a particular cell having a center point that is at the same coordinates as a query point will have a weighting factor of one while the neighboring cells will have a weighting factor of zero. In another example, a query point that is located at coordinates that are equally distant from the center points of four cells will result in a weighting factor of 0.25 for the four individual cells.

Referring to the example 220, the weighting factor for the cell 274 may be the greatest because the query point is closest to the center point of the cell 274. Likewise, the weighting factor for the cell 271 may be the least of the weighting factors for the three neighboring cells because the center point of that cell is the farthest from the query point from among the center points of the three neighboring cells. The weighting factor for the cell 273 may be between the weighting factors for the cells 274 and 271 because the center point of the cell 273 is at a distance from the query point that is between the distances of the query point from the center points of the cells 274 and 271. For example, the weighting factors for the cells 271, 273, and 274 may be, respectively, 0.20, 0.30, and 0.50.

Further at operation 216, the vehicle computing system may determine a weighted average query point response vector using the weighting factors and the vector data for individual cells of the subset of neighbor cells that are nearest the same object as the query point. In examples, the vehicle computing system determines an intermediate query point vector for individual cells of the subset of cells using the vector data for the individual cells. The vehicle computing system may then multiply the respective intermediate query point response vectors for individual cells of the subset of cells by the respective weighting factor for the respective individual cell top generate weighted query point vectors for the individual cells of the subset. The vehicle computing system may then sum these weighted query point vectors to generate a weighted average query point response vector. The vehicle computing system may store the query point vector and/or related data in a data structure for use in further operations, such as trajectory planning for a vehicle.

Referring again to the example 220, the vehicle computing system may determine a query point vector for the individual cells 271, 273, and 274 using the respective cell vector data, center points, and the query point as described herein. The vehicle computing system may then apply the weighting factor for individual cells to the respective query point vector determined for that cell and sum the resulting vectors. For example, where the weighting factors for the cells 271, 273, and 274 may be, respectively, 0.20, 0.30, and 0.50, and the query point vectors for the respective cells may be represented as V(271), V(273) and V(274) (dashed vectors in the example 220), the vehicle computing device may determine that the weighted average query point response vector V(QP) is: V(QP)=((0.20V(271))+(0.30*V(273))+(0.50*V(274))).

At an operation 224, the vehicle computing system may use the weighted average query point response vector, a norm of the weighted average query point response vector, and/or related data (e.g., as represented in a data structure) to determine a trajectory and/or perform other operations. For example, the vehicle computing system may use the weighted average query point response vector (and/or related data) to evaluate an associated trajectory. In certain examples, one or more candidate trajectories may be generated having such weighted average query point response vectors. The candidate trajectories may then be evaluated to determine a least cost trajectory to use for controlling a vehicle through an environment.

Figure 3:
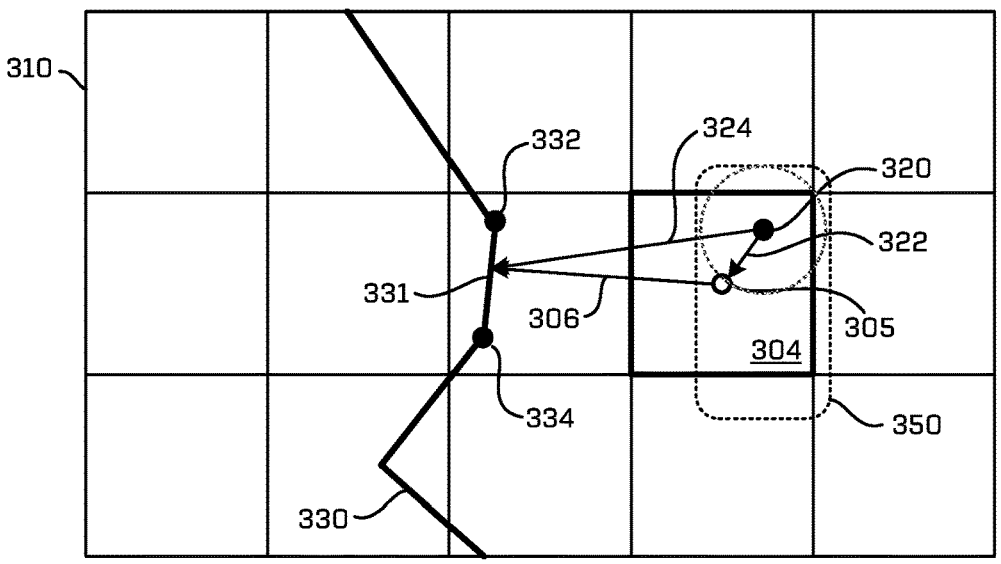
FIG. 3 is a diagrammatic representation of a data structure that may be used to generate a vector map, in accordance with examples of the disclosure.

FIG. 3 illustrates a graphical representation 300 of an example data structure 310 representing various environmental and vector data that may be used in techniques and systems for determining query point vectors as described herein. The data structure 310 may include a plurality of cells representing data associated with an environment. Such data may be based on data detected and/or captured in an environment by one or more sensors (e.g., sensors configured at an autonomous vehicle). The data may represent objects in an environment, such as an object having an edge 330 and a vehicle 350 that may be configured with one or more sensors from which the data of the data structure 310 originated.

A vehicle computing system may perform one or more preprocessing operations on data representing an environment (e.g., sensor data) before using such data is used to perform vehicle tracking, navigation, and/or trajectory planning operations. In examples, the vehicle computing system may determine, for the cells of the data structure 310, vector data for the individual cells using the sensor data associated with the data structure. For example, the vehicle computing system may determine and/or receive (e.g., from a perception component and/or one or more other components of the vehicle computing system) coordinates of reference points, such as the centers of the individual cells, and edges of polygons representing objects in the environment. While the reference points used in this example are cell center points, other types of reference points are contemplated for use in other examples, including corner points (e.g., cell corner points) or any other point in the same dimensional space as a query point (e.g., one, two, three, dimensional or more).

The vehicle computing system may determine vectors for the individual cells of the data structure 310 that represent the distance from the center of a cell to a nearest edge of a nearest object represented in the sensor data. The vehicle computing system may then store data representing these vectors in a data structure that can be used to determine proximity of one or more query points to objects in the environment.

For example, the vehicle computing system may determine that the cell 304 has a center point 305. The vehicle computing system may determine a vector 306 representing the distance and direction from the center point 305 to the nearest edge of the nearest object to the center point 305, which in this example is the segment 331 of the edge 330. The vehicle computing system may store data representing the vector 306 in a data structure and associate such data with the cell 304. In particular examples, the vehicle computing system may store the coordinates of the center point 305 and the vector coordinates of the vector 306 together in a data structure. Alternatively, or in addition, the vehicle computing system may store the coordinates of the center point 305 and the coordinates of the edge segment that is the nearest edge to the center point 305, in this case the edge segment 331 (e.g., the coordinates of edge endpoints 332 and 334), in a data structure. In examples that store the edge segment endpoint coordinates, the vehicle computing system may determine the vector 306 from the coordinates 332 and 334 as needed.

The vehicle computing system may receive a query for object proximity information for one or more query points. In examples, this query function may be associated with or included in any function or operation that may be used control a vehicle. For example, a query function may be included as part of an object detection operation, a trajectory planning operation, or any other operation that may be executed by a vehicle computing system configured at an autonomous vehicle in order to control the vehicle. In other examples, a query function as described herein may be any function using the disclosed data structures, vector data, and/or any of the associated aspects described herein.

In response to the query, the vehicle computing system may determine the coordinates for one or more query points associated with the query and, using the query point coordinates and cell vector data, determine a distance and/or direction from the one or more query points to a nearest edge of a nearest object. In certain examples, as described in more detail herein, the vehicle computing system may also use vector data associated with one or more other cells that may, for example, neighbor or otherwise be proximate to cell in which the query point is associated.

For example, the vehicle computing system may receive a query that requests nearest object data for a query point 320 that may represent a point on the vehicle 350. In particular examples, the query point 320 may be the center of a circle with a diameter approximately the width of the vehicle 350. Alternatively, or in addition, the query point 320 may be any point of interest to the vehicle computing system.

The vehicle computing system may determine that the query point 320 is within the cell 304. The vehicle computing system may then use the coordinates of the query point 320 to determine an intermediate vector 322 from the query point 320 to the center point 305 of the cell 304. The vehicle computing system may add the intermediate vector 322 to the center point vector 306 to determine a query point vector 324 representing an estimate of the distance and direction from the query point 320 to the nearest edge segment 331 of the edge 330 associated with the nearest object in the environment. The query point vector 324 may be used to, as an estimate of nearest object proximity, to perform further vehicle navigation, control, and/or trajectory planning operations.

Figure 4:
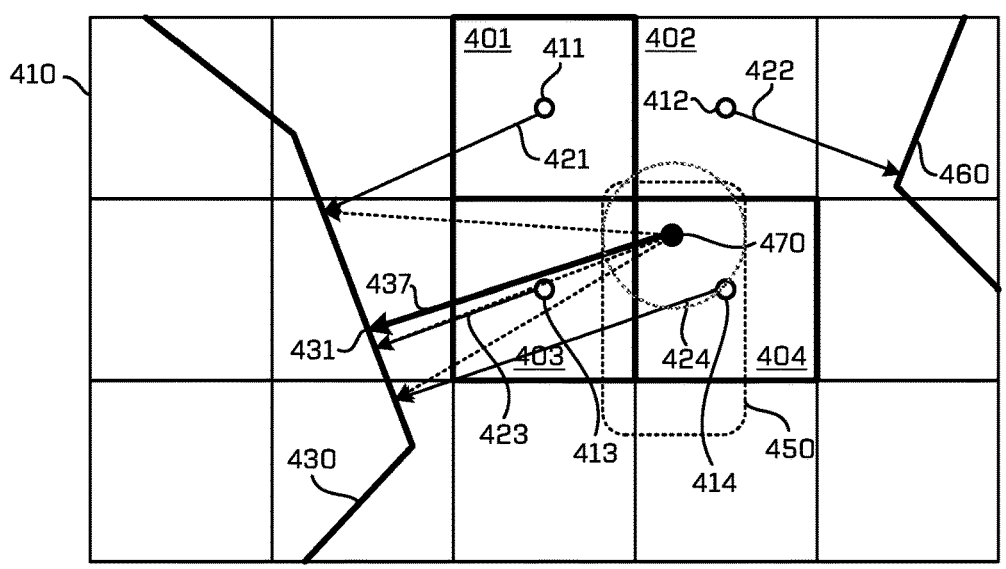
FIG. 4 is a diagrammatic representation of another data structure that may be used to generate a vector map, in accordance with examples of the disclosure.

FIG. 4 illustrates a graphical representation 400 of an example data structure 410 representing various environmental and vector data that may be used in techniques and systems for determining query point vectors as described herein. The data structure 410 may include a plurality of cells representing data associated with an environment. Such data may be based on data detected and/or captured in an environment by one or more sensors (e.g., sensors configured at an autonomous vehicle). The data may represent objects in an environment, such as an object having an edge 430, an object having an edge 460, and a vehicle 450 that may be configured with one or more sensors from which the data of the data structure 410 may have originated. The data structure 410 may also include cell vector data and center point coordinates for the individual cells represented in the data structure, where such vector data may indicate a distance and direction from the individual cell center points to a nearest edge of a nearest object, for example, determined as described herein. While the reference points used in this example are cell center points, other types of reference points are contemplated for use in other examples, including corner points (e.g., cell corner points) or any other point in the same dimensional space as a query point (e.g., one, two, three, dimensional or more).

The vehicle computing system may receive a query for object proximity information for one or more query points. As noted, such query functions may be associated with or included in any function or operation that may be used to control a vehicle. For example, a query function may be included as part of an object detection operation, a trajectory planning operation, or any other operation that may be executed by a vehicle computing system configured at an autonomous vehicle in order to control the vehicle. In other examples, a query function as described herein may be any function using the disclosed data structures, vector data, and/or any of the associated aspects described herein.

For a particular query point, the vehicle computing system may determine a cell in which that query point is located. For example, the vehicle computing system may receive a query that requests nearest object data for a query point 470 that may represent a point on the vehicle 450. In particular examples, the query point 470 may be the center of a circle with a diameter approximately the width of the vehicle 450. Alternatively, or in addition, the query point 320 may be any point of interest to the vehicle computing system. The vehicle computing system may determine that the query point 470 is in the cell 404 (e.g., determine that the coordinates of the query point 470 are within the coordinates of the data structure 410 that are encompassed in the cell 404).

The vehicle computing system may determine one or more neighboring cells for the cell 404. In examples, the vehicle computing system may determine the neighboring cells by determining the cells that are the least distant from the query point 470. For example, to determine the nearest cells to the query point, the vehicle computing system may select the cell 404 containing the query point 470, and also select the three cells from among those directly neighboring the cell containing the query point that are the least distant from the query point 470. In this examples, the vehicle computing system may determine the neighboring cells 401, 402, and 403 by comparing the coordinates of the query point 470 to the coordinates of the center point 414 of the cell 404 and then adding or subtracting one coordinate unit from one or both of the center point coordinates to determine the neighboring cells (e.g., the coordinates of the center points of the neighboring cells). For example, the vehicle computing system may determine that the neighboring cells closest to the query point 470 are cells 401, 402, and 403 based on determining that the query point 470's x coordinate is less than the center point 414's x coordinate, while the query point 470's y coordinate is greater than the center point 414's y coordinate. Therefore, for the cell 404 with center point coordinates (x, y), the neighboring cells are 403 with coordinates (x−1, y) (e.g., the coordinates of the center point 413 of the cell 404), 401 with coordinates (x−1, y+1) (e.g., the coordinates of the center point 411 of the cell 401), and 402 with coordinates (x, y+1) (e.g., the coordinates of the center point 412 of the cell 402), as shown in the figure. In such an example, the remaining nearest neighbors (and/or next nearest neighbors) may be disregarded as the query point 470 lies in the north west quadrant of cell 404 and is closest to the three cells enumerated above. Of course, any number of cells (including n-nearest neighbors) may be used.

The vehicle computing system may determine the vectors for the cells 401, 402, 403, and 404 that indicate the distance and direction from the individual center points of these cells to the nearest edge of the nearest object. For example, the vehicle computing system may use the vector coordinates stored for such cells and/or the nearest edge coordinates stored for such cells to determine the vectors 421, 422, 423, and 424 for the cells 401, 402, 403, and 404, respectively. Using these vectors, the vehicle computing system may determine the polygon edge with which the individual cells are associated. For example, the vehicle computing system may determine that the cells 401, 403, and 404 are closest to the edge 430 (specifically the edge segment 431 of the edge 430), while the cell 402 is closest to the edge 460.

The vehicle computing system may determine a subset, or cluster, of the neighboring cells 401, 402, 403, and 404 that are associated with the object (e.g., as represented by the object edge) that is nearest to the query point 470 (e.g., those cells having center point coordinates nearest to the same object that is nearest to the query point 470). For example, the vehicle computing system may determine the object that is nearest to the query point 470 (e.g., using a query point vector as described herein) is the object associated with the edge 430, and select as members of the cluster of cells those cells that are also associated with the object represented by the edge 430, that is, the cells 401, 403, and 404.

Using the cluster of cells 401, 403, and 404 determined to be nearest to the same object nearest to the query point 470, the vehicle computing system may determine a weighted average query point response vector. In examples, the vehicle computing system may perform an interpolation (whether bilinear, cubic, etc.) using the vector data associated with the individual cells of the cluster and respective weighting factors.

The vehicle computing system may determine weighting factors for the cells in the cluster based on the proximity of the center point of such cells to the query point, with the weighting factor value for a particular cell increasing with the proximity of the query point to the respective center point of that cell. In examples, the weighting factors of the cluster of cells may sum to one. For example, the weighting factor for the cell 404 may be the greatest because the query point 470 is closest to the center point 414 from among the center points 411, 413, and 414 of the cluster of cells 401, 403, and 404. The weighting factor for the cell 401 may be the least of the weighting factors for the cluster of cells because the center point 411 of the cell 401 may be the farthest from the query point 470 from among the center points of the cells in the cluster. The weighting factor for the cell 403 may be between the weighting factors for the cells 404 and 401 because the center point 413 of the cell 403 may be at a distance from the query point 470 that is between the distances of the query point 470 from the center points 414 and 411 of the cells 404 and 401, respectively. For example, the weighting factors for the cells 401, 403, and 404 may be, respectively, 0.15, 0.25, and 0.60, based on the center point 411 being the farthest from the query point 470, the center point 413 being the next farthest from the query point 470, and the center point 414 being the closest to the query point 470.

The vehicle computing system may use these weighting factors to determine a weighted average query point response vector for the query point 470 based on the vector data for the cells of the cluster. In examples, the vehicle computing system may determine a query point vector for the individual cells of the cluster (indicated as dashed vectors in FIG. 4) and then may generate a weighted average query point response vector 437 based on those vectors and the respective weighting factors. For example, the vehicle computing system may determine a query point vector V(401) for the cell 401 by adding a vector representing the distance and direction from the query point 470 to the center point 411 and the center point vector 421. The vehicle computing system may also determine a query point vector V(403) for the cell 403 by adding a vector representing the distance and direction from the query point 470 to the center point 413 and the center point vector 423. The vehicle computing system may also determine a query point vector V(404) for the cell 404 by adding a vector representing the distance and direction from the query point 470 to the center point 414 and the center point vector 424.

The vehicle computing system may then multiply the query point vectors for the cells 401, 403, and 404 of the cluster by their respective weighting factors to generate weighted query point vectors for those cells and sum the weighted query point vectors to generate a weighted average query point response vector 437. The vehicle computing system may store the query point vector and/or related data in a data structure for use in further operations, such as trajectory planning for a vehicle. For example, continuing with the example and notation referenced above where the cells 401, 403, and 404 have weighting factors of 0.15, 0.25, and 0.60, respectively, the weighted average query point response vector 437 (V(437)) may be: V(437)=((0.15*V(401))+(0.25*V(403))+(0.60*V(404))). The vehicle computing system may use the weighted average query point response vector 437 to determine a location of an object in the environment with respect to a vehicle, determine a trajectory of travel for a vehicle, perform one or more other operations to control a vehicle, and/or perform one or more other operations.

Figure 5:
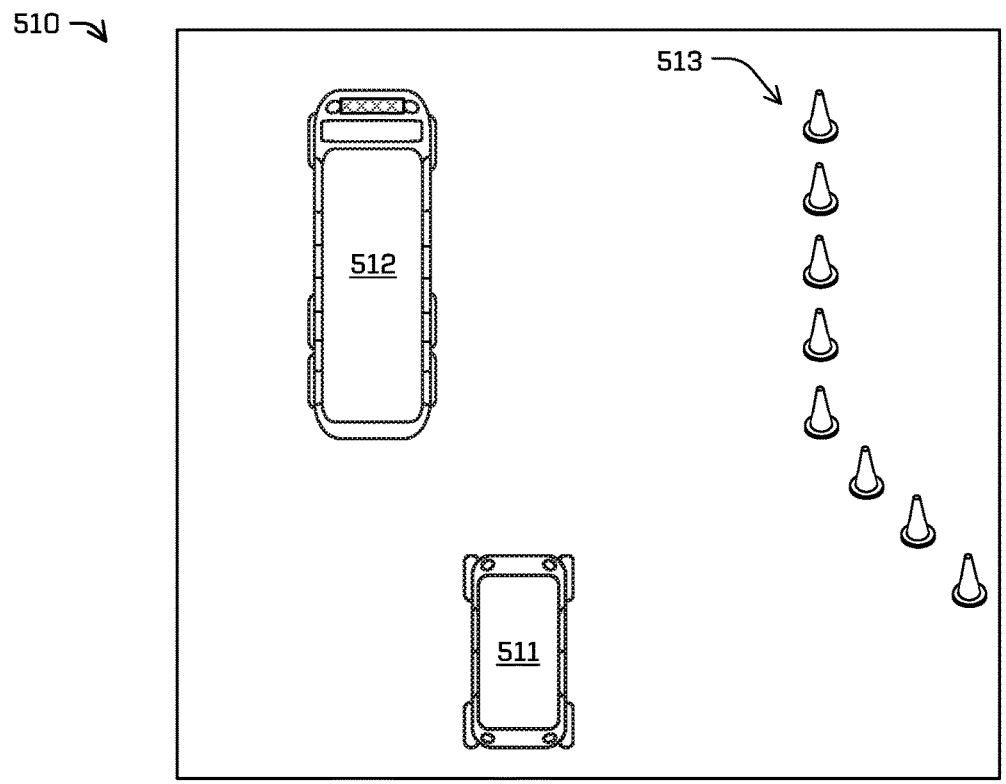
FIG. 5 is a diagrammatic representation of an environment and a vector map that may be used to determine a trajectory through the environment, in accordance with examples of the disclosure.
Figure 5:
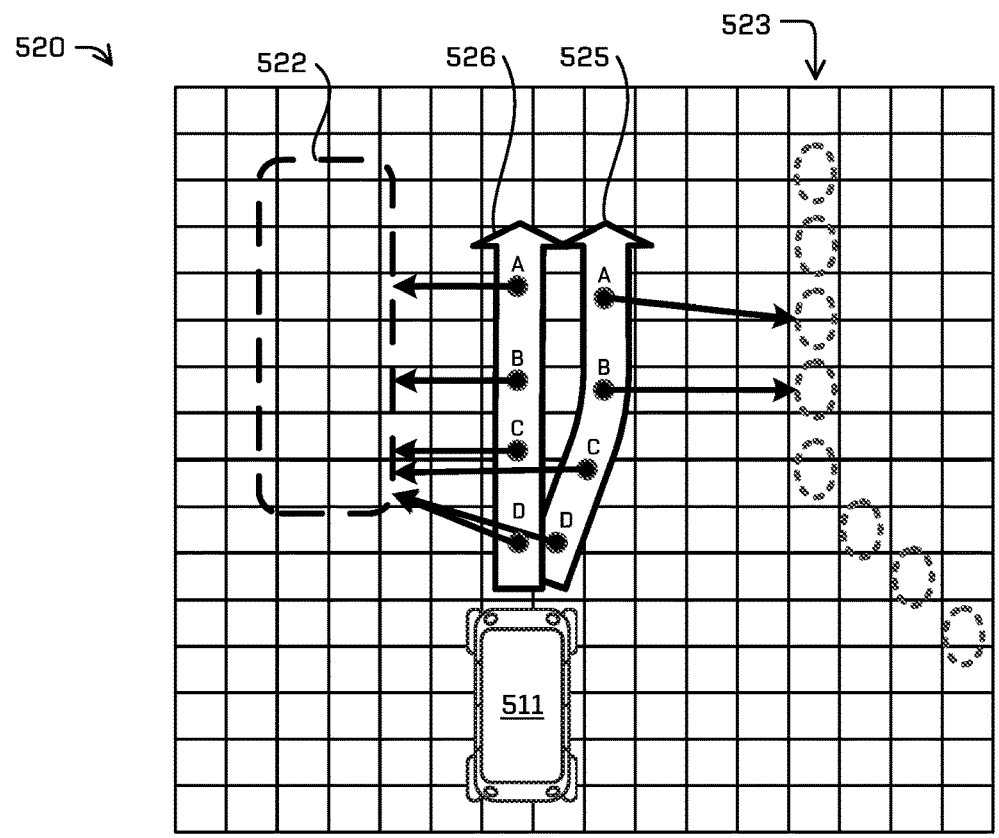

For example, referring now to FIG. 5 illustrating a top-down view 510 of an environment, a vehicle 511 may be travelling through an environment that may contain one or more objects, such as a bus 512 and road cones 513. To safely navigate through this environment, the vehicle computing system operating the vehicle 511 may detect and process data representing such objects. For example, the vehicle 511 may be configured with one or more sensors that may capture data that can be used to generate data structures as described herein (e.g., vector maps, heat maps, etc.).

Using sensor and/or environmental data, the vehicle computing system may generate and/or process a data structure such as vector map 520. As seen in this data structure, various cells of the data structure are coded to indicate the presence of objects and the object's proximity to the vehicle 511. For example, the vehicle computing system may generate a data structure as described herein representing the view 510 with vector data for the individual cells of the data structure representing the distance and direction from the center points of such cells to the nearest edge of the nearest object. The vehicle computing system may process this data structure using query points associated with the vehicle 511 to determine the locations of objects in the environment. The resulting vector map 520 may indicate the proximity of the object in the environment relative to the vehicle 511. For example, the polygon 522 may represent the bus 512 and polygons 523 may represent the road cones 513 in the data structure.

The vehicle computing system may evaluate one or more candidate trajectories for a vehicle (e.g., planned trajectories for the vehicle being controlled by the vehicle computing system and/or predicted trajectories for one or more other objects in motion in the environment) using costs determined for such candidate trajectories to determine a best and/or least cost trajectory for use in planning a trajectory for the vehicle.

For example, the vehicle computing system may determine the candidate trajectories 525 and 526. The candidate trajectories 525 and 526 may have query points A, B, C, D, which may have associated query point vectors indicating the proximity of the closest object determined using the techniques disclosed herein. As shown in the figure, query point vectors 526A, 526B, 526C, 526D indicate that the candidate trajectory 526 is closest to the polygon 522 along the entirety of the trajectory. The query point vectors 525A and 525B are closest to the polygons 523, while the 526C, 526D are closest to the polygon 522 along the candidate trajectory 525. Also as can be seen in this figure, the query point vectors of the trajectory 525 are longer than those of the trajectory 526. Therefore, the vehicle computing system may determine that the candidate trajectory 525 is preferred (e.g., has lower cost due to being safer as indicated by the greater vector lengths compared to the trajectory 526). Thus, by using the vector map 520 and the associated query point vectors, the vehicle computing system may determine that the candidate trajectory 525 is the preferred trajectory for navigating the vehicle 511 through the environment and safely avoiding objects such as the bus 512 and the road cones 513.

FIG. 6 depicts a block diagram of an example system 600 for implementing the techniques described herein. In at least one example, the system 600 can include a vehicle 602. The vehicle 602 can include a vehicle computing device 604 that may function as and/or perform the functions of a vehicle controller (e.g., an autonomous vehicle controller) for the vehicle 602. The vehicle 602 can also include one or more sensor systems 606, one or more emitters 608, one or more communication connections 610, at least one direct connection 612, and one or more drive systems 614.

The vehicle computing device 604 can include one or more processors 616 and memory 618 communicatively coupled with the one or more processors 616. In the illustrated example, the vehicle 602 is an autonomous vehicle; however, the vehicle 602 could be any other type of vehicle. In the illustrated example, the memory 618 of the vehicle computing device 604 stores a localization component 620, a perception component 622, a planning component 624, one or more system controllers 626, one or more maps 628, and a prediction component 630. Though depicted in FIG. 6 as residing in memory 618 for illustrative purposes, it is contemplated that any one or more of the localization component 620, the perception component 622, the planning component 624, the one or more system controllers 626, the one or more maps 628, and the prediction component 630 can additionally, or alternatively, be accessible to the vehicle 602 (e.g., stored remotely).

In at least one example, the localization component 620 can include functionality to receive data from the sensor system(s) 606 to determine a position and/or orientation of the vehicle 602 (e.g., one or more of an x-, y-, z-position, roll, pitch, or yaw). For example, the localization component 620 can include and/or request/receive a map of an environment and can continuously determine a location and/or orientation of the autonomous vehicle within the map. In some instances, the localization component 620 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 620 can provide data to various components of the vehicle 602 to determine an initial position of an autonomous vehicle for generating a trajectory and/or for generating map data, as discussed herein.

In some instances, the perception component 622 can include functionality to perform object detection, segmentation, and/or classification. In some examples, the perception component 622 can provide processed sensor data that indicates a presence of an entity that is proximate to the vehicle 602 and/or a classification of the entity as an entity type (e.g., car, pedestrian, cyclist, animal, building, tree, road surface, curb, sidewalk, traffic signal, traffic light, car light, brake light, unknown, etc.). In additional or alternative examples, the perception component 622 can provide processed sensor data that indicates one or more characteristics associated with a detected entity (e.g., a tracked object) and/or the environment in which the entity is positioned. The perception component 622 may use the multichannel data structures as described herein, such as the multichannel data structures generated by the described deconvolution process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Such entity characteristics may be represented in a multichannel data structure as described herein (e.g., a multichannel data structure generated as output of one or more deconvolution layers (e.g., learned deconvolutional upsampling decoding layer(s)) using a learned upsampling transformation). Characteristics associated with the environment can include, but are not limited to, a presence of another entity in the environment, a state of another entity in the environment, a time of day, a day of a week, a season, a weather condition, an indication of darkness/light, etc. In examples, the perception component 622 can provide processed data that include vector data as described herein.

In general, the planning component 624 can determine a path for the vehicle 602 to follow to traverse through an environment. In examples, the planning component 624 can determine various routes and trajectories and various levels of detail. For example, the planning component 624 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 624 can generate an instruction for guiding the autonomous vehicle along at least a portion of the route from the first location to the second location. In at least one example, the planning component 624 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 602 to navigate. In examples, the planning component 624 can use the vector data and/or associated data structures generated as described herein to determine one or more trajectories or routes for a vehicle to travel.

In examples, the planning component 624 may include a query point vector determination component 632 that performs the operations described herein for determining query point vectors and related data. For example, the query point vector determination component 632 may determine the proximity of a query point to a nearest object as part of a planning operation performed by the planning component 624 using data received from the perception component 622.

In at least one example, the vehicle computing device 604 can include one or more system controllers 626, which can be configured to control steering, propulsion, braking, safety, emitters, communication, and other systems of the vehicle 602. These system controller(s) 626 can communicate with and/or control corresponding systems of the drive system(s) 614 and/or other components of the vehicle 602.

The memory 618 can further include one or more maps 628 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 628 can include at least one map (e.g., images and/or a mesh). In some examples, the vehicle 602 can be controlled based at least in part on the maps 628. That is, the maps 628 can be used in connection with the localization component 620, the perception component 622, and/or the planning component 624 to determine a location of the vehicle 602, identify objects in an environment, and/or generate routes and/or trajectories to navigate within an environment.

In some examples, the one or more maps 628 can be stored on a remote computing device(s) (such as the computing device(s) 642) accessible via network(s) 640. In some examples, multiple maps 628 can be stored based on, for example, a characteristic (e.g., type of entity, time of day, day of week, season of the year, etc.). Storing multiple maps 628 can have similar memory requirements but increase the speed at which data in a map can be accessed.

In general, the prediction component 630 can generate predicted trajectories of objects in an environment. For example, the prediction component 630 can generate one or more predicted trajectories for vehicles, pedestrians, animals, and the like within a threshold distance from the vehicle 602. In some instances, the prediction component 630 can measure a trace of an object and generate a trajectory for the object based on observed and predicted behavior. In examples, the prediction component 630 can use the vector data, vector maps, and/or data structures as described herein to generate one or more predicted trajectories for various mobile objects in an environment.

In some instances, aspects of some or all of the components discussed herein can include any models, algorithms, and/or machine learning algorithms. For example, in some instances, the components in the memory 618 (and the memory 646, discussed below) can be implemented as a neural network. For instance, the memory 618 may include a deep tracking network that may be configured with a convolutional neural network (CNN) that may have one or more convolution/deconvolution layers.

An example neural network is an algorithm that passes input data through a series of connected layers to produce an output. Individual layers in a neural network can also comprise another neural network or can comprise any number of layers, and such individual layers may be convolutional, deconvolutional, and/or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling transformation. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 606 can include radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, microphones, wheel encoders, environment sensors (e.g., temperature sensors, humidity sensors, light sensors, pressure sensors, etc.), etc. The sensor system(s) 606 can include multiple instances of one or more of these or other types of sensors. For instance, the camera sensors can include multiple cameras disposed at various locations about the exterior and/or interior of the vehicle 602. The sensor system(s) 606 can provide input to the vehicle computing device 604. Additionally, or alternatively, the sensor system(s) 606 can send sensor data, via the one or more networks 640, to the one or more computing device(s) at a particular frequency, after a lapse of a predetermined period of time, in near real-time, etc.

The vehicle 602 can also include one or more emitters 608 for emitting light (visible and/or non-visible) and/or sound. The emitter(s) 608 in an example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 602 can also include one or more communication connection(s) 610 that enable communication between the vehicle 602 and one or more other local or remote computing device(s). For instance, the communication connection(s) 610 can facilitate communication with other local computing device(s) on the vehicle 602 and/or the drive system(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device 604 to another computing device or a network, such as network(s) 640. For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 can include one or more drive systems 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include one or more sensor systems to detect conditions of the drive system(s) 614 and/or the surroundings of the vehicle 602. By way of example and not limitation, the sensor system(s) 606 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 614. Furthermore, the drive system(s) 614 may also include one or more communication connection(s) that enable communication by the respective drive system with one or more other local or remote computing device(s).

In at least one example, the direct connection 612 can provide a physical interface to couple the one or more drive system(s) 614 with the body of the vehicle 602. For example, the direct connection 612 can allow the transfer of energy, fluids, air, data, etc. between the drive system(s) 614 and the vehicle. In some instances, the direct connection 612 can further releasably secure the drive system(s) 614 to the body of the vehicle 602.

In some examples, the vehicle 602 can send sensor data to one or more computing device(s) 642 via the network(s) 640. In some examples, the vehicle 602 can send raw sensor data to the computing device(s) 642. In other examples, the vehicle 602 can send processed sensor data and/or representations of sensor data (e.g., data structures representing vector data) to the computing device(s) 642. In some examples, the vehicle 602 can send sensor data to the computing device(s) 642 at a particular frequency, after a lapse of a predetermined period of time, in near real-time, etc. In some cases, the vehicle 602 can send sensor data (raw or processed) to the computing device(s) 642 as one or more log files.

The computing device(s) 642 can include processor(s) 644 and a memory 646 storing a planning component 649, and/or a perception component 648. In some instances, the perception component 648 can substantially correspond to the perception component 622 and can include substantially similar functionality. In some instances, the planning component 649 can substantially correspond to the planning component 624 and can include substantially similar functionality. For example, the planning component 649 may include a query point vector determination component 652 that may perform the operations described herein for determining query point vectors and related data.

The processor(s) 616 of the vehicle 602 and the processor(s) 644 of the computing device(s) 642 can be any suitable processor capable of executing instructions to process data and perform operations as described herein. By way of example and not limitation, the processor(s) 616 and 644 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 646 are examples of non-transitory computer-readable media. The memory 618 and 646 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in alternative examples, components of the vehicle 602 can be associated with the computing device(s) 642 and/or components of the computing device(s) 642 can be associated with the vehicle 602. That is, the vehicle 602 can perform one or more of the functions associated with the computing device(s) 642, and vice versa.

EXAMPLE CLAUSES

A: A system comprising: one or more processors; and one or more non-transitory computer-readable media storing instructions executable by the one or more processors, wherein the instructions, when executed, cause the system to perform operations comprising: receiving sensor data from a sensor associated with an autonomous vehicle in an environment; associating the sensor data with a grid representation of the environment comprising a plurality of cells; associating, with a cell and based at least in part on the sensor data, a vector representing a distance and a direction from a center point of the cell to a nearest edge of a surface; receiving a query for a distance of a query point from a nearest object in the environment; determining that the cell contains the query point; determining an intermediate vector representing a distance and a direction from the query point to the center point; determining, based at least in part on the intermediate vector and the vector, a query point vector representing a distance and a direction from the query point to the nearest edge; and controlling the autonomous vehicle based at least in part on the query point vector.

B: The system of paragraph A, wherein associated the vector with the cell comprises associating first coordinates of a first endpoint of the nearest edge and second coordinates of a second endpoint of the nearest edge with the cell.

C: The system of paragraph A or B, wherein determining the query point comprises: determining a second vector representing a distance and a direction from a second center point of a second cell to the nearest edge; determining a second intermediate vector for the second cell representing a distance and a direction from the query point to the second center point; determining a second query point vector based at least in part on the second intermediate vector and the second vector; and determining the query point vector based at least in part on the second query point vector.

D: The system of paragraph C, wherein determining the query point vector comprises: determining a weighting factor for the cell based at least in part on the distance from the query point to the center point; and determining a second weighting factor for the second cell based at least in part on a distance from the second center point to the query point; and determining the query point vector further based at least in part on the weighting factor and the second weighting factor.

E: The system of any of paragraphs A-D, wherein controlling the autonomous vehicle comprises: determining a plurality of candidate trajectories for controlling the autonomous vehicle through the environment, wherein a trajectory of the plurality of candidate trajectories is associated with the query point vector; and determining the trajectory from among plurality of candidate trajectories based at least in part on the query point vector.

F: A method comprising: receiving sensor data from a sensor associated with a vehicle in an environment; associating, with a reference point representing a portion of the environment and based at least in part on the sensor data, a vector representing a distance and a direction from the reference point to a nearest edge of a surface; receiving a query for a distance of a query point from a nearest object in the environment; and determining, based at least in part on the vector and a distance and a direction from the query point to the reference point, a query point vector representing a distance and a direction from the query point to the nearest edge.

G: The method of paragraph F, wherein determining the query point vector is further based on a second vector associated with a second reference point, the second vector representing a distance and a direction from second reference point to the nearest edge.

H: The method of paragraph G, further comprising: determining that a third vector associated with a third reference point represents a distance and a direction from the third reference point to a second nearest edge of a second object in the environment, wherein the second object is distinct from the nearest object; and in response determining that the third vector represents the distance and the direction from the third reference point to the second nearest edge, determining the query point vector further based on the second vector and excluding the third vector.

I: The method of any of paragraphs F-H, wherein associating the vector with the reference point comprises: determining first coordinates of a first endpoint of the nearest edge and second coordinates of a second endpoint of the nearest edge; and associating the first coordinates and the second coordinates with the reference point.

J: The method of any of paragraph I, wherein determining query point vector comprises determining the vector based at least in part on the first coordinates and the second coordinates.

K: The method of any of paragraphs F-J, wherein determining the query point vector comprises: determining a second query point vector based at least in part on a second reference point; and determining the query point vector based at least in part on determining a weighted average of the query point vector to the second query point vector.

L: The method of any of paragraphs F-K, wherein the reference point is one of a center point or a corner point of a cell in a data structure.

M: The method of any of paragraphs F-L, further comprising determining a cost associated with a trajectory for controlling the vehicle in the environment based at least in part on the query point vector.

N: The method of any of paragraphs F-M, further comprising determining a trajectory for controlling an autonomous vehicle using the query point vector.

O: One or more non-transitory computer-readable media storing instructions that, when executed by one or more processors, perform operations comprising: associating, with a reference point representing a portion of an environment and based at least in part on sensor data received from a sensor associated with a vehicle in the environment, a vector representing a distance and a direction from the reference point to a nearest edge of a surface; receiving a query requesting a distance of a query point from a nearest object in the environment; and determining, based at least in part on the vector and a distance and a direction from the query point to the reference point, a query point vector representing a distance and a direction from the query point to the nearest edge.

P: The one or more non-transitory computer-readable media of paragraph O, wherein the operations further comprise transmitting a vector map comprising a representation of the query point vector to a vehicle controller.

Q: The one or more non-transitory computer-readable media of paragraph O or P, wherein determining the query point vector comprises determining a weighting factor for the query point vector based at least in part on the distance from the query point to the reference point.

R: The one or more non-transitory computer-readable media of any of paragraphs O-Q, wherein the operations further comprise determining a second vector for a second reference point, wherein determining the query point vector is further based on the second vector.

S: The one or more non-transitory computer-readable media of any of paragraphs O-R, wherein the operations further comprise determining a predicted trajectory for a vehicle in the environment using the query point vector.

T: The one or more non-transitory computer-readable media of any of paragraphs O-S, wherein the reference point is one of a center point or a corner point of a cell in a vector map.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the system to perform operations comprising:
   receiving sensor data from a sensor associated with an autonomous vehicle in an environment;
   associating the sensor data with a grid representation of the environment comprising a plurality of cells;
   associating, with a cell and based at least in part on the sensor data, a vector representing a distance and a direction from a center point of the cell to a nearest edge of a surface;
   receiving a query for a distance of a query point from a nearest object in the environment;
   determining that the cell contains the query point;
   determining an intermediate vector representing a distance and a direction from the query point to the center point;
   determining, based at least in part on the intermediate vector and the vector, a query point vector representing a distance and a direction from the query point to the nearest edge; and
   controlling the autonomous vehicle based at least in part on the query point vector.

2. The system of claim 1, wherein associating the vector with the cell comprises associating first coordinates of a first endpoint of the nearest edge and second coordinates of a second endpoint of the nearest edge with the cell.

3. The system of claim 1, wherein determining the query point comprises:
   determining a second vector representing a distance and a direction from a second center point of a second cell to the nearest edge;
   determining a second intermediate vector for the second cell representing a distance and a direction from the query point to the second center point;
   determining a second query point vector based at least in part on the second intermediate vector and the second vector; and
   determining the query point vector based at least in part on the second query point vector.

4. The system of claim 3, wherein determining the query point vector comprises:
   determining a weighting factor for the cell based at least in part on the distance from the query point to the center point; and
   determining a second weighting factor for the second cell based at least in part on a distance from the second center point to the query point; and
   determining the query point vector further based at least in part on the weighting factor and the second weighting factor.

5. The system of claim 1, wherein controlling the autonomous vehicle comprises:
   determining a plurality of candidate trajectories for controlling the autonomous vehicle through the environment, wherein a trajectory of the plurality of candidate trajectories is associated with the query point vector; and
   determining the trajectory from among the plurality of candidate trajectories based at least in part on the query point vector.

6. A method comprising:
  receiving sensor data from a sensor associated with a vehicle in an environment;
  associating, with a reference point representing a portion of the environment and based at least in part on the sensor data, a vector representing a distance and a direction from the reference point to a nearest edge of a surface;
  receiving a query for a distance of a query point from a nearest object in the environment; and
  determining, based at least in part on the vector and a distance and a direction from the query point to the reference point, a query point vector representing a distance and a direction from the query point to the nearest edge.

7. The method of claim 6, wherein determining the query point vector is further based on a second vector associated with a second reference point, the second vector representing a distance and a direction from second reference point to the nearest edge.

8. The method of claim 7, further comprising:
  determining that a third vector associated with a third reference point represents a distance and a direction from the third reference point to a second nearest edge of a second object in the environment, wherein the second object is distinct from the nearest object; and
  in response determining that the third vector represents the distance and the direction from the third reference point to the second nearest edge, determining the query point vector further based on the second vector and excluding the third vector.

9. The method of claim 6, wherein associating the vector with the reference point comprises:
  determining first coordinates of a first endpoint of the nearest edge and second coordinates of a second endpoint of the nearest edge; and
  associating the first coordinates and the second coordinates with the reference point.

10. The method of claim 9, wherein determining query point vector comprises determining the vector based at least in part on the first coordinates and the second coordinates.

11. The method of claim 6, wherein determining the query point vector comprises:
  determining a second query point vector based at least in part on a second reference point; and
  determining the query point vector based at least in part on determining a weighted average of the query point vector to the second query point vector.

12. The method of claim 6, wherein the reference point is one of a center point or a corner point of a cell in a data structure.

13. The method of claim 6, further comprising determining a cost associated with a trajectory for controlling the vehicle in the environment based at least in part on the query point vector.

14. The method of claim 6, further comprising determining a trajectory for controlling an autonomous vehicle using the query point vector.

15. One or more non-transitory computer-readable media storing instructions that, when executed by one or more processors, perform operations comprising:
  associating, with a reference point representing a portion of an environment and based at least in part on sensor data received from a sensor associated with a vehicle in the environment, a vector representing a distance and a direction from the reference point to a nearest edge of a surface;
  receiving a query requesting a distance of a query point from a nearest object in the environment; and
  determining, based at least in part on the vector and a distance and a direction from the query point to the reference point, a query point vector representing a distance and a direction from the query point to the nearest edge.

16. The one or more non-transitory computer-readable media of claim 15, wherein the operations further comprise transmitting a vector map comprising a representation of the query point vector to a vehicle controller.

17. The one or more non-transitory computer-readable media of claim 15, wherein determining the query point vector comprises determining a weighting factor for the query point vector based at least in part on the distance from the query point to the reference point.

18. The one or more non-transitory computer-readable media of claim 15, wherein the operations further comprise determining a second vector for a second reference point, wherein determining the query point vector is further based on the second vector.

19. The one or more non-transitory computer-readable media of claim 15, wherein the operations further comprise determining a predicted trajectory for a vehicle in the environment using the query point vector.

20. The one or more non-transitory computer-readable media of claim 15, wherein the reference point is one of a center point or a corner point of a cell in a vector map.

* * * * *